３,317,239
TRAILER CONSTRUCTION
Keith W. Tantlinger, Grosse Pointe Shores, Mich., assignor to Fruehauf Corporation, Detroit, Mich., a corporation of Michigan
Filed Jan. 21, 1966, Ser. No. 522,226
3 Claims. (Cl. 296—100)

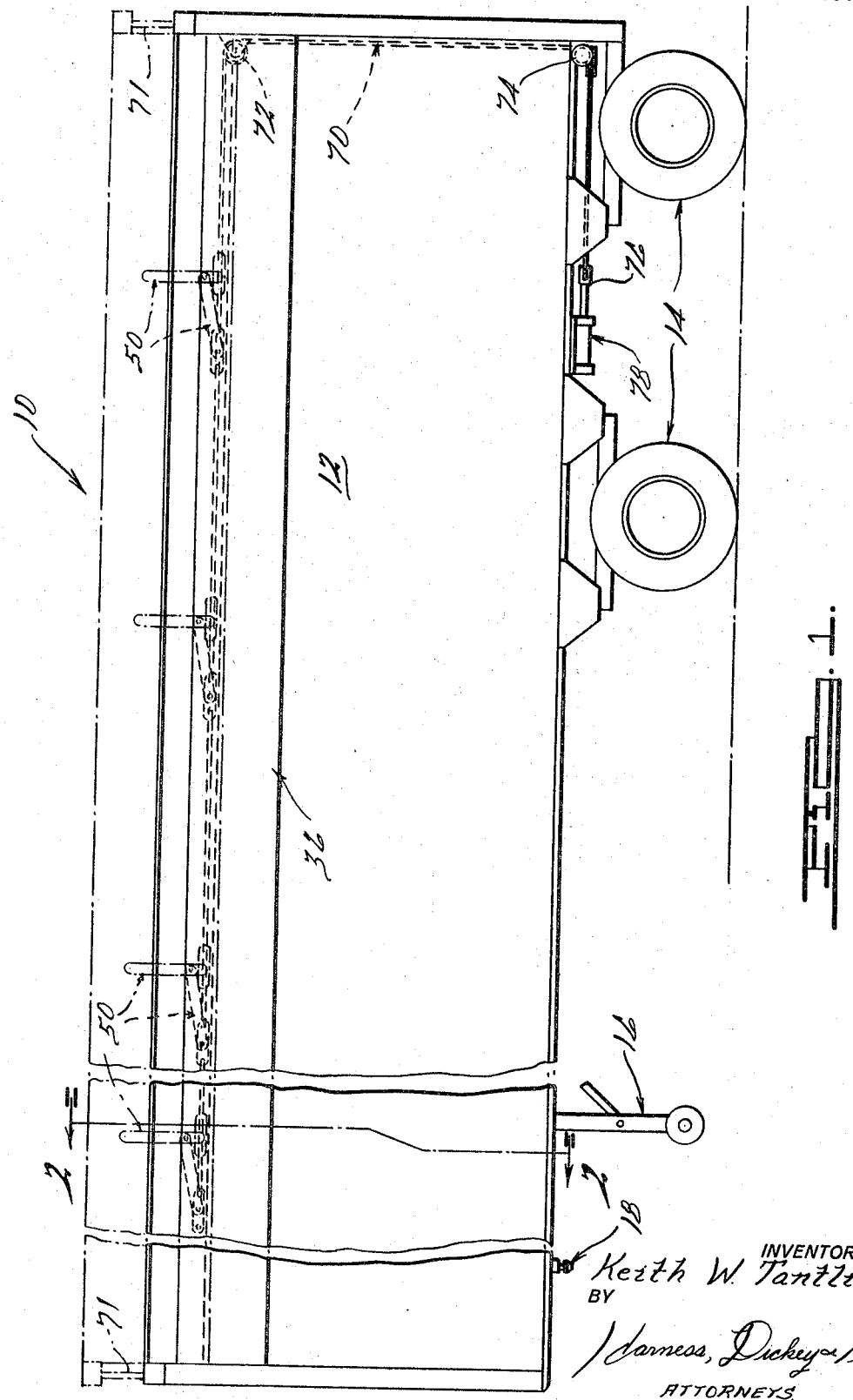

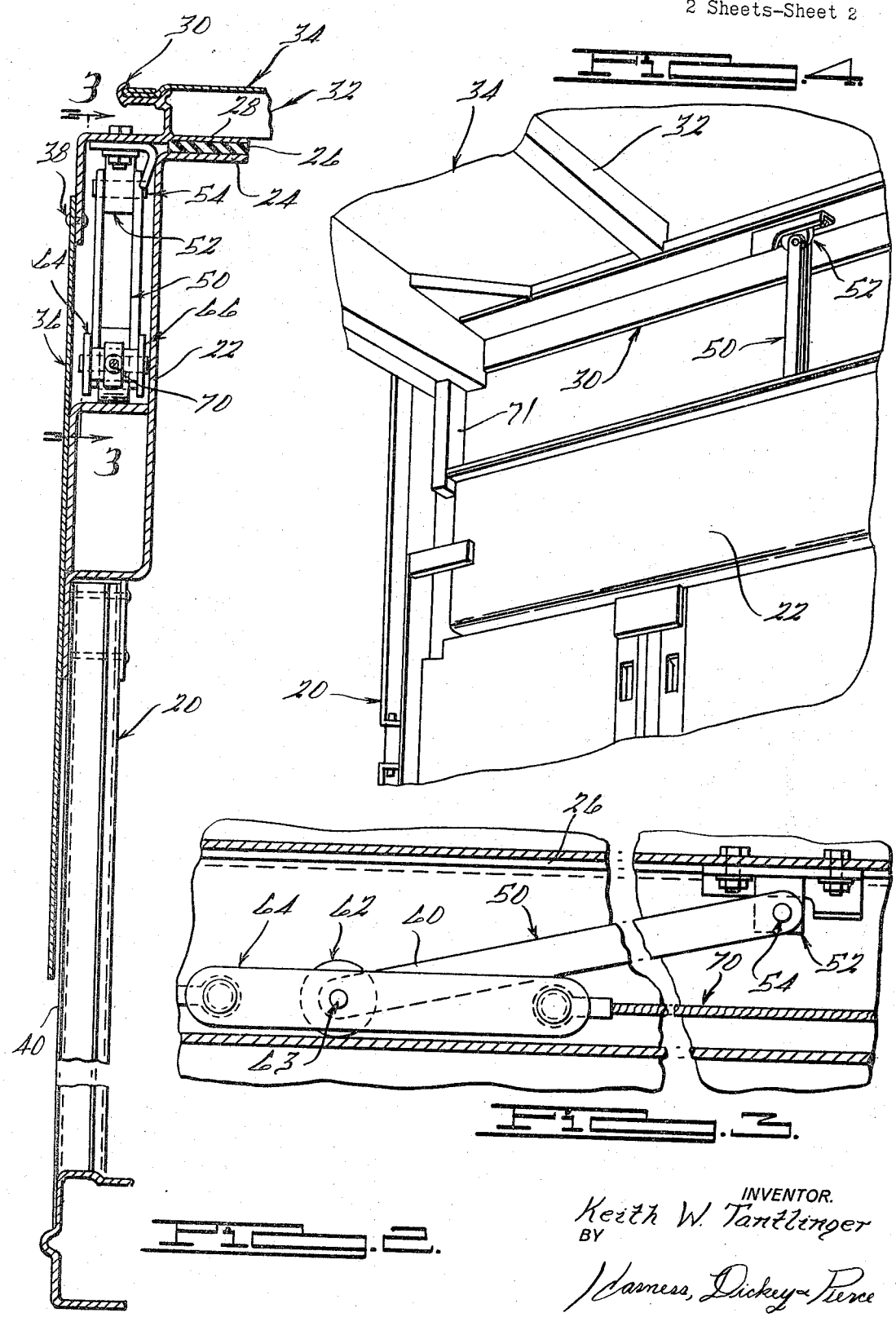

This invention relates generally to heavy duty over-the-road semi-trailers and more particularly to a novel elevatable roof for such trailers.

One of the problems faced by trucking firms is the number and variety of state laws regulating the size of over-the-road transport vehicles. Attempts at codifying vehicle laws among the several states have been successful only to a limited degree resulting in inefficient operation of vehicles in many instances.

Another problem that arises when a semi-trailer is loaded to capacity is that sufficient clearance must be provided under the roof of the trailer to allow for stacking of goods or containers within the trailer. Thus, it often occurs, that a clearance space must be left under the roof of the vehicle which space is in effect wasted.

Both of the aforementioned problems are solved in accordance with the instant invention by a heavy duty over-the-road semi-trailer that has an elevatable roof. The roof is elevatable to a maximum height in states allowing such an extension and lowerable to a minimum height to satisfy other state requirements. Furthermore, even when operating at the minimum height configuration, the elevatable roof is elevatable to effect loading of the trailer and thereafter lowered to utilize virtually the entire cube of the trailer within the gross dimension restrictions.

Accordingly, one object of the instant invention is an elevatable roof construction for a heavy duty over-the-road semi-trailer.

Other objects and advantages of the instant invention will be apparent in the following specification, claims and drawings, wherein:

FIGURE 1 is a side elevational view of a heavy duty over-the-road semi-trailer having the elevatable roof of the instant invention;

FIG. 2 is a cross sectional view taken substantially along the line 2—2 of FIGURE 1;

FIG. 3 is a cross sectional view taken substantially along the line 3—3 of FIGURE 2, and FIG. 4 is a perspective view of the upper rear corner of the trailer of FIGURE 1 showing the roof in the elevated condition.

As seen in FIGURE 1 of the drawings, a heavy duty over-the-road semi-trailer 10 comprises a van 12 having a conventional wheel suspension 14, landing gear 16, and kingpin 18.

As best seen in FIGURE 2 of the drawings, a side wall 20 of the trailer 10, which is exemplary of each of the side walls thereof, is provided with a top rail 22 having a laterally inwardly extending flange 24 thereon. A longitudinally extending seal 26 is secured to the flange roof 24 for engagement with a flange 28 on a roof cap rail 30.

The roof cap rail 30 has secured thereto a plurality of longitudinally spaced roof beams 32 that extend laterally of the trailer 10 for the support of a roof skin 34. The cap rail 30 also has a downwardly extending panel 36 secured thereto, as by rivets 38, the panel 36 overlying an outer skin 40 on the side wall 20.

In accordance with the instant invention, the trailer roof is elevatable relative to the side wall 20 by a plurality of double link arms 50, each of which is pivotally secured to a bracket 52, respectively, on the cap rail 30 by suitable pins 54. The lower end 60 of each arm 50 is provided with a roller 62 that is journaled on a pin 63 that extends through the arm 50 and through a pair of spaced cable connectors 64 and 66. The cable connectors 64 and 66 are connected to one another longitudinally of the trailer 10 by a flexible cable 70. Movement of the roof is controlled by suitable vertical guides 71 at each corner thereof.

As best seen in FIG. 1 of the drawings, the cable 70 extends between each of the arms 50 thence over a sheave 72 at the upper rear of the trailer 10, thence around a sheave 74 at the lowermost extremity of the rear of the trailer, thence is connected to a piston 76 of a hydraulic or pneumatic cylinder 78.

As can best be seen in FIGURE 1 by comparing the full line position with the phantom lines, tensioning of the cable 70 by the actuator 78 effects rearward movement of the connectors 64 and 66 which in turn effects rearward movement of the rollers 62 and arms 50. Since the roof portion is restrained from rearward movement by the vertical guides 71, movement of the arms 50 effects elevation of the roof. When it is desired to lower the roof, the tension on the cable 70 is relieved and the weight of the roof causes it to settle driving the lower end 60 of each arm 50 forwardly to the position illustrated in FIGURE 3 of the drawings.

It is to be understood that the improved trailer construction herein disclosed and described is presented for the purposes of explanation and illustration and is not intended to indicate limits of the invention the scope of which is defined by the following claims.

What is claimed is:
1. An elevatable roof for a heavy duty over-the-road vehicle having a pair of longitudinally extending vertical side walls, said elevatable roof comprising,
   an elongated roof panel,
   a plurality of arms pivotally secured to the longitudinal edges of said roof panel, each of said arms having a roller secured to the lower end thereof,
   a longitudinally extending upper rail on said side walls, respectively, for seating said rollers,
   a plurality of vertical guides extending between said roof panel and the side wall panels of said vehicle for limiting said roof panel to vertical movement relative to said side walls, and
   means for concomitantly moving the lower ends of each of said arms longitudinally thereby to effect elevation of said roof.

2. An elevatable roof in accordance with claim 1 wherein said roof panel has downwardly extending panels on the sides thereof overlapping the side panels of said vehicle on the exterior thereof.

3. An elevatable roof in accordance with claim 1 wherein said moving means comprises a flexible cable interconnecting said arms and a fluid powered actuator for tensioning said cable.

References Cited by the Examiner

UNITED STATES PATENTS

| 1,871,871 | 8/1932 | Woods. |
| 2,239,888 | 4/1941 | Forrester _____ 296—105 |
| 2,531,880 | 11/1950 | Herring _____ 108—145 X |
| 2,624,535 | 1/1953 | Bollhoefer _____ 108—145 X |
| 2,656,216 | 10/1953 | Bobroff. |
| 3,161,433 | 12/1964 | Markel _____ 296—27 |

BENJAMIN HERSH, Primary Examiner.

C. C. PARSONS, Assistant Examiners.